United States Patent [19]
Hosoya

[11] Patent Number: 5,619,481
[45] Date of Patent: Apr. 8, 1997

[54] INFORMATION RECORDING/REPRODUCING METHOD

[75] Inventor: Hideki Hosoya, Yokohama, Japan

[73] Assignee: Canon Kabushiki Kaisha, Tokyo, Japan

[21] Appl. No.: 394,165

[22] Filed: Feb. 22, 1995

[30] Foreign Application Priority Data

Feb. 23, 1994 [JP] Japan ..................................... 6-25147

[51] Int. Cl.$^6$ ................................................. G11B 17/22
[52] U.S. Cl. .................. 369/32; 369/47; 369/48; 369/54; 235/454
[58] Field of Search ................................. 369/32, 47, 48, 369/15, 54, 53; 235/454

[56] References Cited

U.S. PATENT DOCUMENTS

| | | | |
|---|---|---|---|
| 5,164,577 | 11/1992 | Horie | 235/494 |
| 5,398,225 | 3/1995 | Sugaya et al. | 369/48 |
| 5,469,546 | 11/1995 | Hospya | 369/54 X |

FOREIGN PATENT DOCUMENTS

| | | | |
|---|---|---|---|
| 0524810 | 1/1993 | European Pat. Off. | G06F 3/06 |
| 5027915 | 2/1993 | Japan | G06F 3/06 |

OTHER PUBLICATIONS

"Method For Translating Logical Block addresses To Physical addresses on Magneto–Optic Media", IBM Technical Disclosure Bulletin, vol. 35, No. 4A, Sep. 1992, New York, US, pp. 35–40.

*Primary Examiner*—David C. Nelms
*Assistant Examiner*—Huan Hoang
*Attorney, Agent, or Firm*—Fitzpatrick, Cella, Harper & Scinto

[57] ABSTRACT

An information recording/reproducing operation is performed in accordance with a command from a host computer via a small computer system interface on an information recording medium having a plurality of tracks, each of which has a plurality of sectors arranged thereon. When an error occurs during execution of a command accompanied by an operation of reproducing information from the information recording medium, the command is terminated by using a check condition status, and status information of all sectors on a track, of the information recording medium, which includes a logical block in which the error has occurred is set in sense data.

2 Claims, 8 Drawing Sheets

| BIT BYTE | 7 | 6 | 5 | 4 | 3 | 2 | 1 | 0 |
|---|---|---|---|---|---|---|---|---|
| 0 | VALID | ERROR CLASS(7) | | | ERROR CODE(0) | | | |
| 1 | SEGMENT NUMBER(0) | | | | | | | |
| 2 | FM (0) | EOM (0) | ILI (0) | R(0) | SENSE KEY | | | |
| 3 | (MSB) | INFORMATION BYTE | | | | | | |
| 4 | INFORMATION BYTE | | | | | | | |
| 5 | INFORMATION BYTE | | | | | | | |
| 6 | INFORMATION BYTE | | | | | | | (LSB) |
| 7 | ADDITIONAL SENSE LENGTH(09H) | | | | | | | |
| 8 | (0) | | | | | | | |
| ~11 | (0) | | | | | | | |
| 12 | SENSE CODE | | | | | | | |
| 13 | SECTOR STATUS(SECTOR-1) | | | | | | | |
| 14 | SECTOR STATUS(SECTOR-2) | | | | | | | |
| 15 | SECTOR STATUS(SECTOR-3) | | | | | | | |
| 16 | SECTOR STATUS(SECTOR-4) | | | | | | | |

FIG. 3 PRIOR ART

| BIT<br>BYTE | 7 | 6 | 5 | 4 | 3 | 2 | 1 | 0 |
|---|---|---|---|---|---|---|---|---|
| 0 | OPERATION CODE (0AH) ||||||||
| 1 | LOGICAL UNIT NUMBER ||| (MSB) | LOGICAL BLOCK ADDRESS ||||
| 2 | LOGICAL BLOCK ADDRESS ||||||||
| 3 | LOGICAL BLOCK ADDRESS (LSB) ||||||||
| 4 | TRANSFER LENGTH ||||||||
| 5 | 0 | 0 | RESERVED (0) |||| 0 | 0 |

FIG. 4 PRIOR ART

| BIT<br>BYTE | 7 | 6 | 5 | 4 | 3 | 2 | 1 | 0 |
|---|---|---|---|---|---|---|---|---|
| 0 | VALID | \multicolumn{3}{l}{ERROR CLASS(7)} | | | \multicolumn{3}{l}{ERROR CODE(0)} | | |
| 1 | \multicolumn{8}{c}{SEGMENT NUMBER(0)} | | | | | | | | |
| 2 | FM(0) | EOM(0) | ILI(0) | R(0) | \multicolumn{4}{l}{SENSE KEY} | | | | |
| 3 | \multicolumn{8}{l}{(MSB) INFORMATION BYTE(PARTITION NUMBER)} | | | | | | | | |
| 4 | \multicolumn{8}{l}{INFORMATION BYTE(PARTITION NUMBER)} | | | | | | | | |
| 5 | \multicolumn{8}{l}{INFORMATION BYTE(LOGICAL BLOCK ADDRESS)} | | | | | | | | |
| 6 | \multicolumn{8}{l}{INFORMATION BYTE(LOGICAL BLOCK ADDRESS) (LSB)} | | | | | | | | |
| 7 | \multicolumn{8}{l}{ADDITIONAL SENSE LENGTH(05H)} | | | | | | | | |
| 8 | \multicolumn{8}{c}{(0)} | | | | | | | | |
| ~11 | \multicolumn{8}{c}{(0)} | | | | | | | | |
| 12 | \multicolumn{8}{c}{SENSE CODE} | | | | | | | | |

FIG. 5

| BIT<br>BYTE | 7 | 6 | 5 | 4 | 3 | 2 | 1 | 0 |
|---|---|---|---|---|---|---|---|---|
| 0 | VALID | \multicolumn{3}{c}{ERROR CLASS(7)} | \multicolumn{4}{c}{ERROR CODE(0)} | | | |
| 1 | \multicolumn{8}{c}{SEGMENT NUMBER(0)} | | | | | | | |
| 2 | FM(0) | EOM(0) | ILI(0) | R(0) | \multicolumn{4}{c}{SENSE KEY} | | | |
| 3 | (MSB) | \multicolumn{7}{c}{INFORMATION BYTE} | | | | | | |
| 4 | \multicolumn{8}{c}{INFORMATION BYTE} | | | | | | | |
| 5 | \multicolumn{8}{c}{INFORMATION BYTE} | | | | | | | |
| 6 | \multicolumn{7}{c}{INFORMATION BYTE} | (LSB) | | | | | | |
| 7 | \multicolumn{8}{c}{ADDITIONAL SENSE LENGTH(09H)} | | | | | | | |
| 8 ~ 11 | \multicolumn{8}{c}{(0) ... (0)} | | | | | | | |
| 12 | \multicolumn{8}{c}{SENSE CODE} | | | | | | | |
| 13 | \multicolumn{8}{c}{SECTOR STATUS(SECTOR-1)} | | | | | | | |
| 14 | \multicolumn{8}{c}{SECTOR STATUS(SECTOR-2)} | | | | | | | |
| 15 | \multicolumn{8}{c}{SECTOR STATUS(SECTOR-3)} | | | | | | | |
| 16 | \multicolumn{8}{c}{SECTOR STATUS(SECTOR-4)} | | | | | | | |

FIG. 6
| BIT BYTE | 7 | 6 | 5 | 4 | 3 | 2 | 1 | 0 |
|---|---|---|---|---|---|---|---|---|
| 13~16 | VALID | R/V STATUS | | SCAN | PHYSICAL SECTOR NUMBER | | | |
FIG. 7
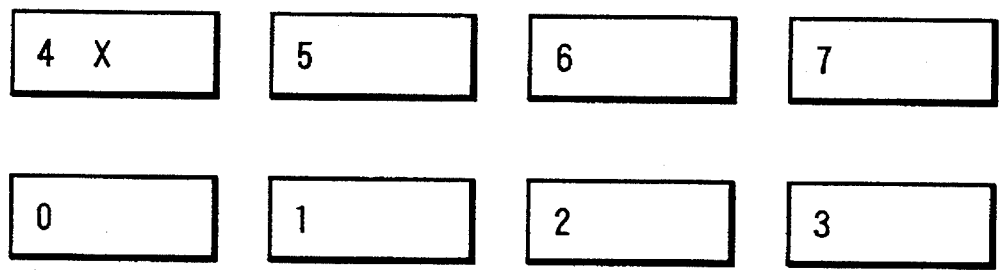
FIG. 8
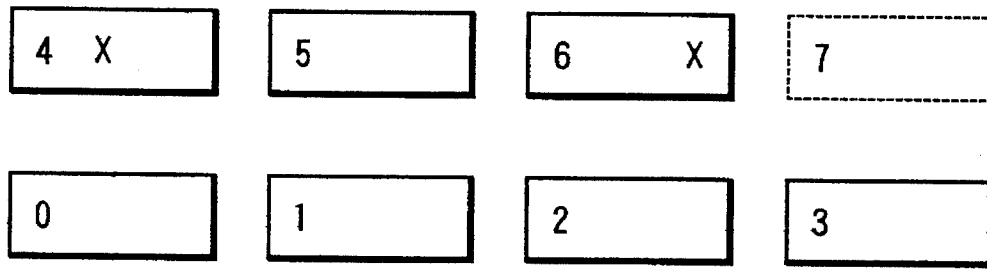

INFORMATION RECORDING/REPRODUCING METHOD

BACKGROUND OF THE INVENTION

1. Field of the Invention

The present invention relates to an information recording/reproducing method for recording/reproducing predetermined information on/from an information recording medium in accordance with commands sent from a host computer via a SCSI (Small Computer System Interface).

2. Related Background Art

A SCSI was standardized as ANSI X3. 131-1986 after deliberation at the X3T9.2 committee of the ANSI (American National Standards Institute) on the basis of an interface SASI (Shugart Associates System Interface) for connection between small computers and their peripheral devices available from Shugart, U.S.A. The SCSI has been increasingly accepted as a standard interface for connection between personal computers and their peripheral devices. Recently, attempts have been made on standardization of a SCSI-2 as a new version of the SCSI. At present, however, a final decision has not been reached yet. The range of the SCSI rules defined by the ANSI includes the following five points:

(1) the types and definitions of interface signals and the timings of signal exchange;

(2) a protocol for defining the operation sequence of an interface and the definitions of phases and the like;

(3) physical interface conditions such as cable specifications and connector specifications, and electrical conditions for a transmission system;

(4) a command system for executing various types of control of peripheral devices, the formats of commands, and the functions of commands; and (5) the format of a status byte for informing a host computer of a command execution result, and the structure of sense data for informing an abnormal state in the process of executing the command.

The command system in item (4) is defined as follows. SCSI commands are classified into eight groups. The first byte of a CDB (Command Description Block) is an operation code. The upper three bits of this code designate a group code; and the lower five bits, a command code (a code indicating the type of command) for each group. The lengths of CDBs in the respective groups are defined as follows:

(1) group 0: 6 bytes (2) group 1: 10 bytes (3) groups 2 to 4: reserved (4) group 5: 12 bytes (5) groups 6 and 7: vendor unique (vender specific)

CDBs in groups 6 and 7 are command groups which can be uniquely defined by each SCSI device. In the logical block address of each command, fixed-length data blocks are consecutively arranged on a logical unit.

FIG. 1 shows the format of logical blocks in a hard disk unit. Referring to FIG. 1, a data block specified by cylinder=0 and sector=0 is defined as logical block address=0, and the logical block address is incremented by one every time the sector, the track, and the cylinder are incremented by one in the order named. The advantage of a logical block address is that no physical structure needs to be considered because an initiator (host computer) accesses data by designating the logical block address of the first data block and the number of blocks to be processed. With the use of logical block addresses, therefore, when devices based on different specifications concerning the numbers of cylinders, tracks, sectors, and the like are connected to each other, they can be operated by the same software.

FIG. 2 shows the arrangement of a general SCSI system. Although a physical device such as a hard disk like the one shown in FIG. 1 is generally connected as a logical unit, a logical unit number (LUN) may be assigned to a physical or virtual device. In general, in a SCSI, eight logical units of LUN=0 to 7 can be connected to a SCSI bus. By using an extension message, a maximum of 2,048 logical units can be connected.

As described above, a CDB of a SCSI command consists of six bytes or more. FIG. 3 shows a CDB of a Write command in group 0. Referring to FIG. 3, Logical Unit Number indicates a logical unit for which the command is issued; Logical Block Address, a logical block of the command which is to be executed first; and Transfer Length, the number of logical blocks to be executed consecutively. Assume that a Write command is issued. In this case, data is recorded in consecutive logical blocks, of a logical unit indicated by the Logical Unit Number bits, which ranges from a logical block indicated by the Logical Block Address bytes to a logical block indicated by the Transfer Length byte.

In the SCSI interface, when a command terminates normally, the target returns a good status to the initiator. In contrast to this, if a command terminates abnormally, the target returns a check condition status to the initiator, and creates sense data like the one shown in FIG. 4. Referring to FIG. 4, "Valid" indicates whether Information Bytes at bytes 3 to 6 are valid. If Valid=1, they are valid. Error Class and Error Code indicate the format of sense data. If Error Class=7 and Error Code=0, they indicate extended sense data. Sense Key indicates the type of error; and Information Bytes, the location (logical block) of an error. Additional Sense Length indicates the number of bytes of sense data added after byte 8. Sense Code indicates the detailed information of an error.

When a check condition status is returned from the target to the initiator in response to an issued command, the initiator issues a request status command and receives sense data created by the target. With this operation, the initiator can determine the kind of error from Sense Key and Sense Code, and the location of the error from Information Bytes if valid=1.

As described above, upon reception of a command with respect to a plurality of logical blocks, the target generally sets sense data and terminates the command by sending a check condition status when an error is caused. Consider, for example, a Read command with respect to five consecutive logical blocks from logical block 1 to logical block 5. When a read error occurs in the process of reading logical block 3, the target sets Sense Key to 3H (Medium Error); Sense Code to 11H (Read Error); Information Bytes to 3 (indicating a logical block in which the error has occurred); Valid to 1 (indicating the Information Bytes are valid) in sense data, and returns a check condition status to the initiator. The initiator receives the sense data by issuing a request status command, and issues a Read command again with respect to logical block 3 indicated by the Information Bytes. With this operation, a retry with respect to the error can be performed. As described above, Information Bytes generally indicate a logical block address for which the initiator should perform a retry next.

As conventional information recording media, a floppy disk for magnetically recording/reproducing information, an optical information recording medium for optically recording/reproducing information, and the like are known. Optical information recording media are available in various forms, e.g., disk-like, card-like, and tape-like forms. Of these optical information recording media, a card-like optical information recording medium (to be referred to as an optical card hereinafter) is expected to be in great demand as an information recording medium which is compact and lightweight and hence can be easily carried, and has a relatively large capacity. Information recording media are classified into erasable, rewritable media and media which allows no such operations. Optical cards are generally used as media which are not erasable nor rewritable. Therefore, optical cards are expected to be used in the medical field and the like in which the above characteristic is considered as an advantage.

In a recording/reproducing apparatus using such an optical card as a recording medium, the optical card and a light beam for a recording/reproducing operation are reciprocated relative to each other to record/reproduce information on/from the recording surface of the optical card. In a recording/reproducing operation, light beam control techniques such as automatic focusing (AF) and automatic tracking (AT) are used to position a light beam on a track on a recording surface.

When a plurality of logical blocks (sectors) are arranged on one track as is the case with an optical card or optical disk, logical blocks present on the same track within a logical block range defined by a CDB of a command are subjected to write processing at once, and the written data are verified at once, instead of writing and verifying in units of sectors. Since the processing time can be shortened by performing processing in units of tracks, this method is generally used. Assume that logical blocks present on the same track are processed at once. In this case, if errors occur in a plurality of sectors on the same target track, the errors in the plurality of logical sectors cannot be informed to the host computer at once, because only a set of Information Bytes are prepared, in sense data defined by the conventional SCSI, as bytes for informing the host computer of logical block in which an error has occurred. Generally, in this case, therefore, a logical block in which an error has occurred first is set in Information Bytes, and the host computer executes a retry operation from the logical block in which the error has occurred first.

Assume that a Write and Verify command is issued with respect to a plurality of logical blocks, and verify errors occur in a plurality of logical blocks in a logical block range designated by a CDB of a command. In this case, a logical block address at which an error has occurred first from the viewpoint of a command, i.e., in general, the smallest address of the logical blocks at which the errors have occurred, is set in Information Bytes.

In practice, however, there may be a subsequent logical block or blocks for which a command has terminated normally. This is also true of cases wherein read errors occur upon issuing of a Read command, and verify errors occur upon issuing of a Verify command, as long as the command is issued with respect to a plurality of logical blocks. According to the conventional information recording/reproducing method, since there is no method of informing a host computer of information about logical blocks after a logical block in which an error has occurred first, the host computer cannot help performing a retry from an address set in an Information Byte. Consequently, retry processing is wastefully performed upon occurrence of an error, resulting in an increase in processing time.

SUMMARY OF THE INVENTION

The present invention has been made in consideration of the above conventional problems, and has as its object to provide an information recording/reproducing method capable of greatly shortening the processing time in the event of an error.

In order to achieve the above object, there is provided an information recording/reproducing method for recording/reproducing predetermined information on/from an information recording medium having a plurality of tracks, each having one or a plurality of sectors arranged thereon, in accordance with a command from a host computer via a small computer system interface, characterized in that when an error occurs during execution of a command accompanied by an operation of reproducing information from the information recording medium, the command is terminated by using a check condition status, and status information of all sectors on a track, of the information recording medium, which includes a logical block in which the error has occurred is set in sense data.

The present invention will be described in detail in the embodiment described later.

BRIEF DESCRIPTION OF THE DRAWINGS

FIG. 3 shows a CDB of a write command in a SCSI interface;

FIG. 4 shows an example of sense data used in a conventional information recording/reproducing method;

FIG. 5 shows sense data, which is used in an embodiment of the present invention and which represents the characteristic feature of the present invention best;

FIG. 6 is a view for explaining the format of a sector status byte in sense data used in the embodiment of the present invention;

FIG. 7 is a view for explaining the embodiment of the present invention;

FIG. 8 is a view for explaining the embodiment of the present invention;

DETAILED DESCRIPTION OF THE PREFERRED EMBODIMENT

Figure 1:
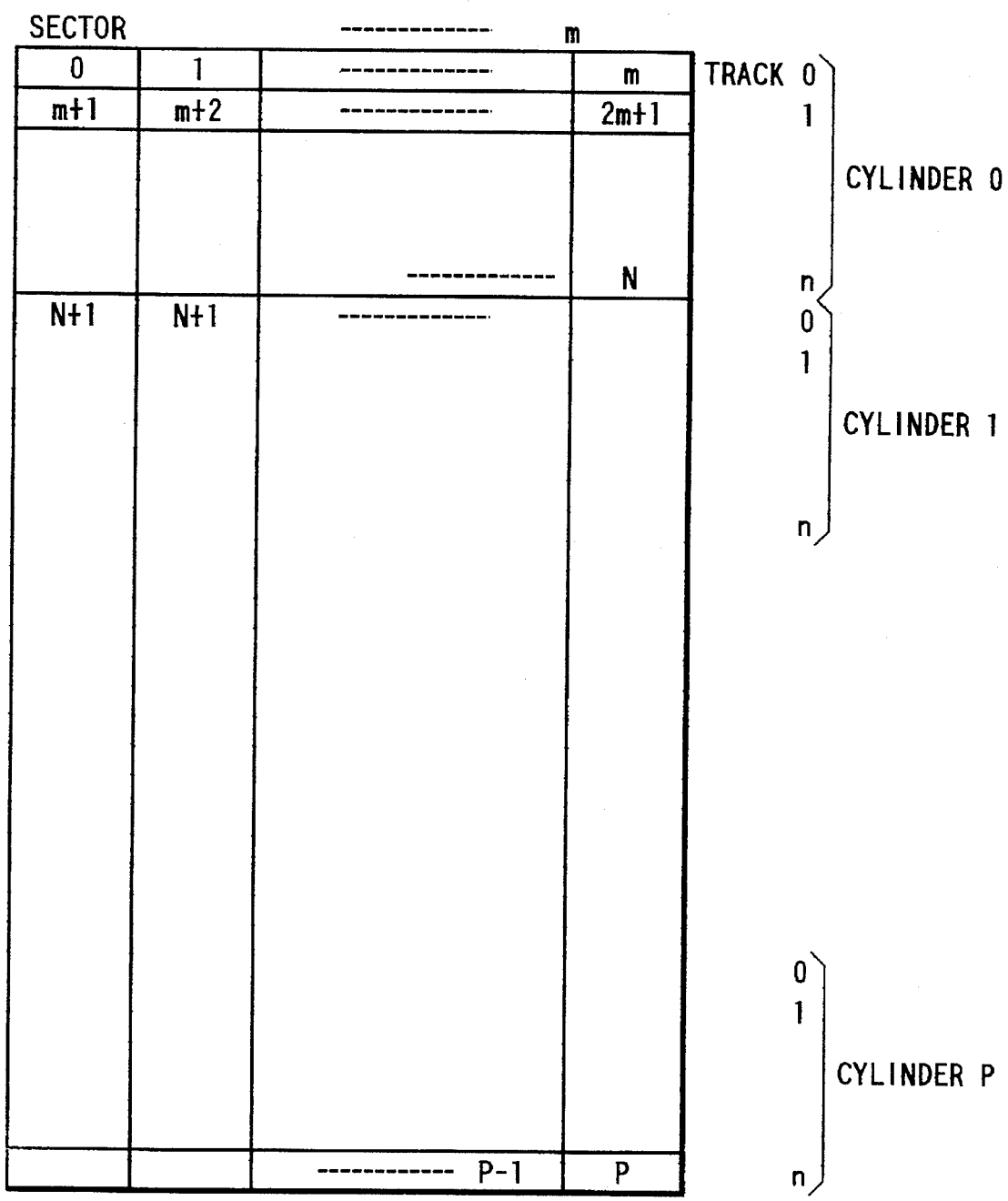
FIG. 1 is a view showing the format of logical blocks in a hard disk unit.
Figure 2:
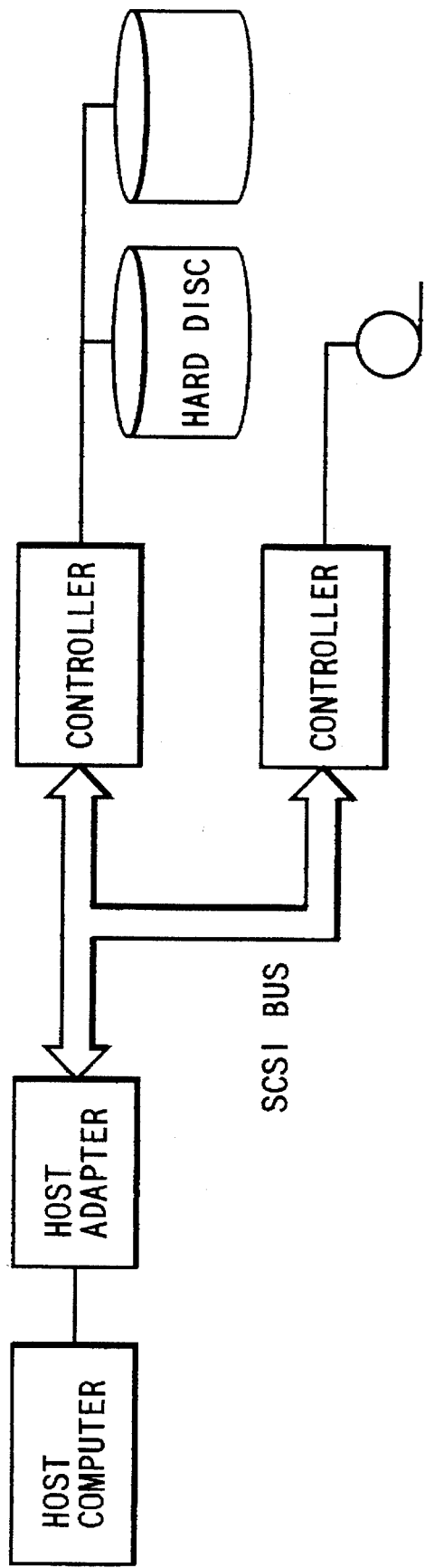
FIG. 2 is a block diagram showing the arrangement of a general SCSI system.
Figure 9:
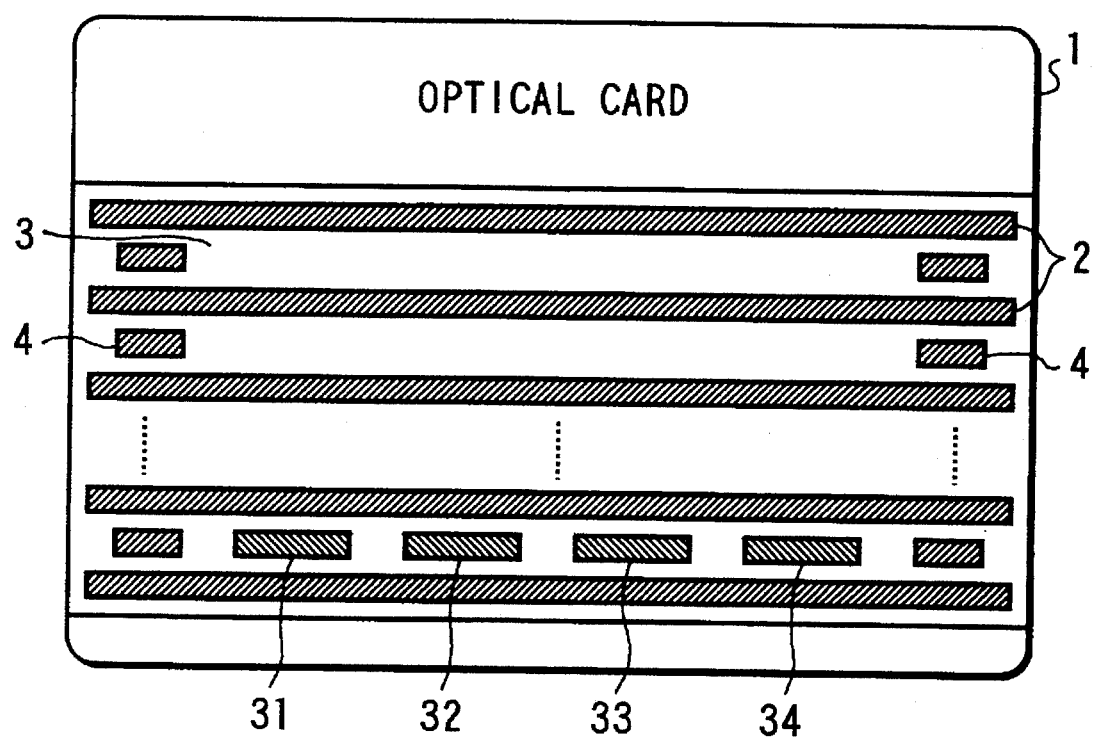
FIG. 9 is a plan view showing an optical card used as an information recording medium in the embodiment.

An embodiment of the present invention will be described in detail with reference to the accompanying drawings. The arrangement of an optical card used as an information recording medium in this embodiment will be described first. FIG. 9 is a plan view showing an example of this optical card. A plurality of tracking tracks 2 are arranged on an optical card 1 to be parallel to each other, and data tracks 3 are arranged between the respective tracking tracks 2. Physical track numbers 4 indicating the physical position of each data track 3 are pre-formatted on the two ends of the data track 3. Four sectors 31, 32, 33, and 34 (corresponding to sector numbers 1 to 4 on each track) are arranged on each data track 3. Physical track number 4 is 0 on the lower end side of the optical card 1 and sequentially incremented toward the upper end side of the optical card 1 up to 2,499 on the uppermost end. That is, 2,500 data tracks 3 are arranged on the optical card 1, and a total of 10,000 sectors are arranged on the tracks.

The sectors on the optical card 1 correspond to the logical blocks of a SCSI. Sector 1 of physical track 0 corresponds to logical block 0; sector 4 of physical track 0, logical block 3; and sector 4 of physical track 2,499, logical block 9,999. In general, in an optical card, a plurality of sector types of different sector sizes can be supported. Although the number of sectors arranged on one track is not limited to four, it is assumed in the following description that four sectors are arranged on one track, as shown in FIG. 9.

Figure 10:
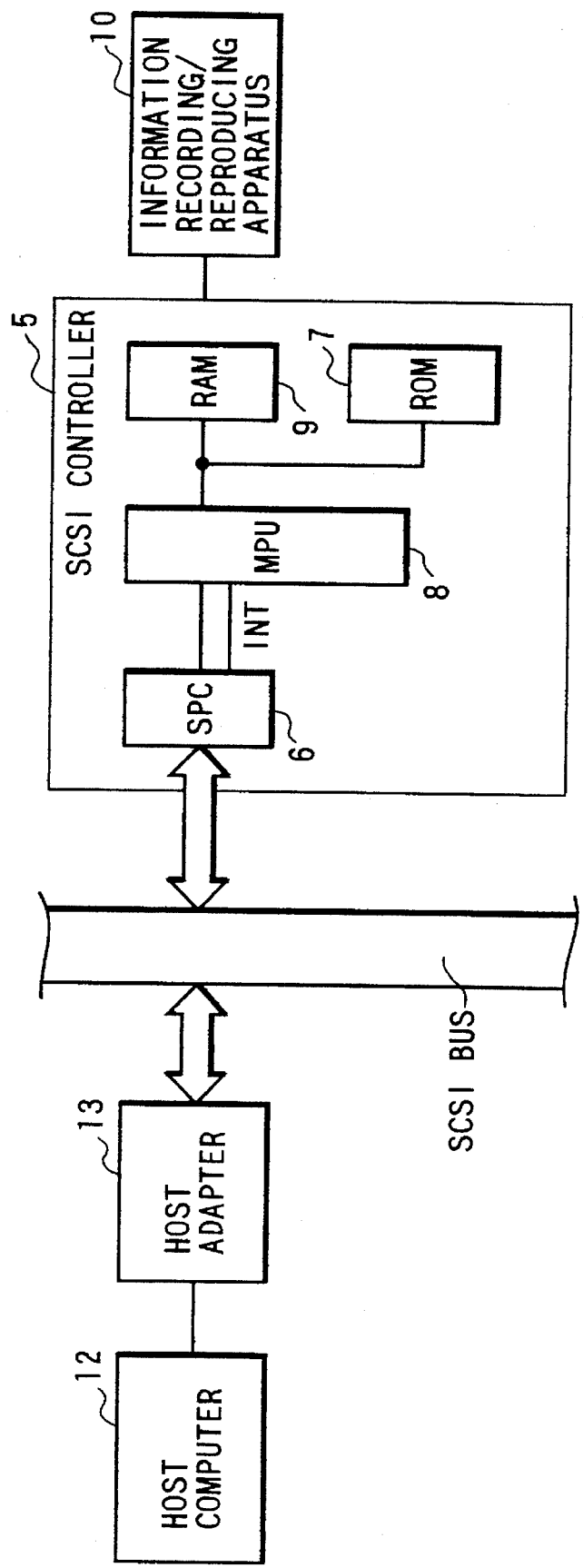
FIG. 10 is a block diagram showing the arrangement of a SCSI system.

FIG. 10 is a block diagram showing a SCSI system. Referring to FIG. 10, a SCSI controller 5 serves as a target. The SCSI controller 5 is constituted by a SCSI protocol circuit (SPC) 6 for performing sequence control of a SCSI signal on the basis of the SCSI standards, an MPU 8 as a control unit for controlling the SCSI controller 5 in accordance with programs stored in a ROM 7, and a RAM 9 used as a buffer memory for recording/reproducing data or used to stored sense data. An information recording/reproducing apparatus is connected to the SCSI controller 5. The optical card 1 described with reference to FIG. 9 is inserted in the information recording/reproducing apparatus 10, and information is recorded or reproduced in accordance with a command from a host computer 12. This system also includes a host adaptor 13.

FIG. 5 shows sense data used in this embodiment. In the embodiment, when errors occur upon issuing of a command accompanied by a reproducing operation, the following pieces of information are set in sense data to be set. The smallest address of the logical blocks at which the errors have occurred is set in Information Bytes, and status information of all the sectors on a track on the optical track including a logical block corresponding to the logical block address set in the Information Bytes is set in Sector Status bytes in units of sectors. In this case, since four sectors are arranged on one track of the optical card shown in FIG. 9, four bytes from byte 13 to byte 16 in the sense data are used for Sector Status.

FIG. 6 shows the format of a sector status byte in sense data. Referring to FIG. 6, "Valid" at bit 7 indicates whether the corresponding byte is valid. Valid=0 and Valid=1 respectively indicate that the byte is invalid and valid. Bit 7 of a byte corresponding to a sector which is not a target for a command becomes 0. Physical Sector Number at bits 0 to 3 indicates the physical sector number indicated by the byte. "Scan" at bit 4 indicates whether a light beam is scanned on a physical sector indicated by the byte, i.e., whether a recording/reproducing operation with respect to the sector is performed. Scan=0 and Scan=1 respectively indicate that scanning is performed and not performed. Note that Scan=0 does not indicate normal termination. For example, even if AT fails during a recording/reproducing operation with respect to the sector, Scan=0 is set. In contrast to this, if AT fails before the sector is scanned, Scan=1 is set.

R/V Status at bits 5 and 6 indicates a read/verify result obtained with respect to a physical sector indicated by the corresponding byte. This result is valid only when Scan=0. R/V Status=00 indicates normal termination; R/V Status= 01, that data could not be read/verified (recorded); R/V Status=10, that the number of read/verified data has not reached a specified number; and R/V Status=11, an ECC decode error/verify error.

Each of FIGS. 7 and 8 shows a recorded state of data on the optical card 1. An information recording/reproducing method of this embodiment will be described below with reference to these drawings. Referring to FIGS. 7 and 8, each rectangle drawn in a solid line indicates a logical block (sector) on which data is recorded; each rectangle drawn in a dotted line, a logical block on which no data is recorded; a number in each rectangle, a logical block address; and each sign "x", the location of an error. Assume that data have already been recorded on blocks 0 to 3 in the case shown in FIG. 7, and data have already been recorded on blocks 0 to 6 in the case shown in FIG. 8.

Assume that a Write and Verify command with respect to logical block 4 to logical block 7 is issued from the host computer 12 in the case shown in FIG. 7. If recording and verifying operations terminate normally with respect to all the logical blocks, the SCSI controller 5 returns a good status to the host computer 12 via the SCSI bus.

Assume that a verify error has occurred at logical block 4 in the case shown in FIG. 7. Note that verify processing is generally performed in the opposite direction to recording processing in a recording/reproducing apparatus using an optical card. Assume, therefore, that recording processing is performed in the order of logical blocks 4, 5, 6, and 7, and verify processing is performed in the order of logical blocks 7, 6, 5, and 4. If a verify error occurs at logical block 4, the SCSI controller 5 sets sense data in the RAM 9 and returns a check condition status to the host computer 12 via the SCSI bus. At this time, "4" indicating a logical block address at which an error has occurred is set in Information Bytes in the sense data. The status information of all the sectors on the same track as that of logical block 4 set in the Information Bytes is respectively set in bytes 13 to 16 of the sense data. These values are E1H, 82H, 83H, and 84H, respectively.

When a verify error occurs, 3H (Medium Error) and OCH (Write Error) are respectively set as a Sense Key and a Sense Code. In this case, the host computer 12 can determine from bytes 13 to 16 that an error has occurred only at one block, and physical sector 1 indicated by byte 13 is logical block 4 indicated by the Information Bytes. In addition, since it is known that a Write and Verify command with respect to three blocks indicated by bytes 14 to 16, i.e., logical blocks 5 to 7, has terminated normally, the host computer 12 need only perform a retry operation with respect to logical bock 4 indicated by the Information Bytes, but need not perform a retry operation with respect to logical blocks 5 to 7.

Assume that a Verify command with respect to four logical blocks from logical block 3 to logical block 6 is issued from the host computer 12, and a verify error has occurred at logical block 4, while AT has failed during reproduction of logical block 6, in FIG. 8. At this time, the SCSI controller 5 sets sense data in the RAM 9, and returns a check condition status to the host computer 12 via the SCSI bus. In Information Bytes in the sense data, "4" indicating the smallest address among logical block addresses at which the error has occurred is set. In bytes 13 to 16 of the sense data, E1H, 82H, C3H, and 14H are respectively set. Since sector 4 indicated by byte 16 is not a target for the command, Valid=0 is set.

In this case, the host computer 12 can determine from bytes 13 to 16 that errors have occurred at two blocks, and physical sector 1 indicated by byte 13 is logical block 4 indicated by the Information Bytes. In addition, the host computer 12 can determine that the command has terminated normally with respect to physical sector 3 indicated by byte 14, i.e., logical block 5. Therefore, the host computer 12 need only perform a retry operation with respect to logical block 6 indicated by byte 15 of the sense sense but need not perform a retry operation with respect to logical block 5.

In the above embodiment, since four sectors are arranged on one track of the optical card shown in FIG. 9, four bytes ranging from byte 13 to byte 16 are used for Sector Status bytes. It is, however, apparent that the number of bytes is determined in accordance with the number of sectors arranged on one track. In this case, as the number of bytes used for Sector Status, the number of bytes equal to the maximum number of sectors arranged on one track of an information recording medium supported by the information recording/reproducing apparatus may be ensured as a fixed value in advance. Alternatively, as indicated by the concept of partitions disclosed in, e.g., Japanese Laid-Open Patent Application No. 5-27915, the number of bytes used for Sector Status may be changed in accordance with the number of sectors arranged on one track which is determined by the sector type used for recording/reproduction processing upon issuing of a command associated with recording/reproduction processing. In any case, it suffices to ensure the number of bytes large enough to store status information associated with all the sectors arranged on one track.

As has been described above, according to the present invention, when an error occurs during execution of a command such as a Read, Write and Verify, or Verify command, which is accompanied by at least a reproducing operation, the following pieces of information are set in sense data. The smallest logical block addresses among logical blocks at which the error has occurred is set in an Information Byte of the sense data. In addition, status information of all the sectors present on a track of the information recording medium which includes a logical block corresponding to the address set in the Information Bytes is set in units of sectors independently of the Information Bytes in the sense data. Therefore, information required for an initiator to perform a retry can be provided, and the initiator need not perform unnecessary retry processing, thereby greatly shortening the processing time as compared with the prior art.

What is claimed is:

1. An information recording/reproducing method for recording/reproducing predetermined information on/from an information recording medium having a plurality of tracks, each having one or a plurality of sectors arranged thereon, in accordance with a command from a host computer via a small computer system interface, characterized in that when an error occurs during execution of a command accompanied by an operation of reproducing information from said information recording medium, the command is terminated by using a check condition status, and status information of all sectors on a track, of the information recording medium, which includes a logical block in which the error has occurred is set in sense data.

2. A method according to claim 1, wherein said medium is a card-like information recording medium.

* * * * *

UNITED STATES PATENT AND TRADEMARK OFFICE
CERTIFICATE OF CORRECTION

PATENT NO.   : 5,619,481
DATED        : April 8, 1997
INVENTOR(S)  : HIDEKI HOSOYA It is certified that error appears in the above-identified patent and that said Letters Patent is hereby corrected as shown below:

On the title page, item:

[56] REFERENCES CITED

"5027915  2/1993  Japan" should read
--5-27915  2/1993  Japan--.

COLUMN 3

Line 12, "allows" should read --allow--.

COLUMN 6

Line 43, "bock" should read --block--.

COLUMN 7

Line 1, "sense sense" should read --sense data--.

Signed and Sealed this

Second Day of December, 1997

Attest:

BRUCE LEHMAN

Attesting Officer        Commissioner of Patents and Trademarks